United States Patent [19]
Ha

[11] Patent Number: 5,867,041
[45] Date of Patent: Feb. 2, 1999

[54] CLOCK SIGNAL TESTING APPARATUS FOR USE IN A SYNCHRONOUS TRANSMISSION SYSTEM

[75] Inventor: Jae-Sul Ha, Incheon, Rep. of Korea

[73] Assignee: Daewoo Telecom Ltd., Incheon, Rep. of Korea

[21] Appl. No.: 774,838

[22] Filed: Dec. 27, 1996

[30] Foreign Application Priority Data

Dec. 30, 1995 [KR] Rep. of Korea .................. 1995-69191

[51] Int. Cl.⁶ .................................................. G01R 19/00
[52] U.S. Cl. ................................ 327/20; 327/292; 371/61
[58] Field of Search ................................ 327/18, 20, 292; 371/61

[56] References Cited

U.S. PATENT DOCUMENTS

| 4,144,448 | 3/1979 | Pisciotta et al. | 327/20 |
| 4,379,993 | 4/1983 | Holden | 327/20 |
| 4,644,498 | 2/1987 | Bedard et al. | 327/292 |

*Primary Examiner*—Kenneth B. Wells
*Attorney, Agent, or Firm*—Pennie & Edmonds LLP

[57] ABSTRACT

An apparatus for use in a synchronous transmission system (STS) efficiently tests N clock signals provided from a device incorporated in the STS, wherein N is a positive integer larger than 1 and the N clock signals are represented by a first predetermined clock frequency. The N clock signals are first received by a counting device in response to a reset signal issued by a system controller in the STS to produce an error reference signal for each of the N received clock signals. And then, at a clock generator, a reference clock signal represented by a second predetermined clock frequency is provided. A first set of error detection signals for the N clock signals is derived based on the N clock signals, the reference clock signal and the error reference signals at a first error detection device. Thereafter, at a second error detection device, a second set of error detection signals for the N clock signals is obtained based on the reference clock signal and the error reference signals. Finally, the first and the second sets of error detection signals are logically combined at an error decision device to thereby produce information representing the status of each of the N clock signals.

19 Claims, 1 Drawing Sheet

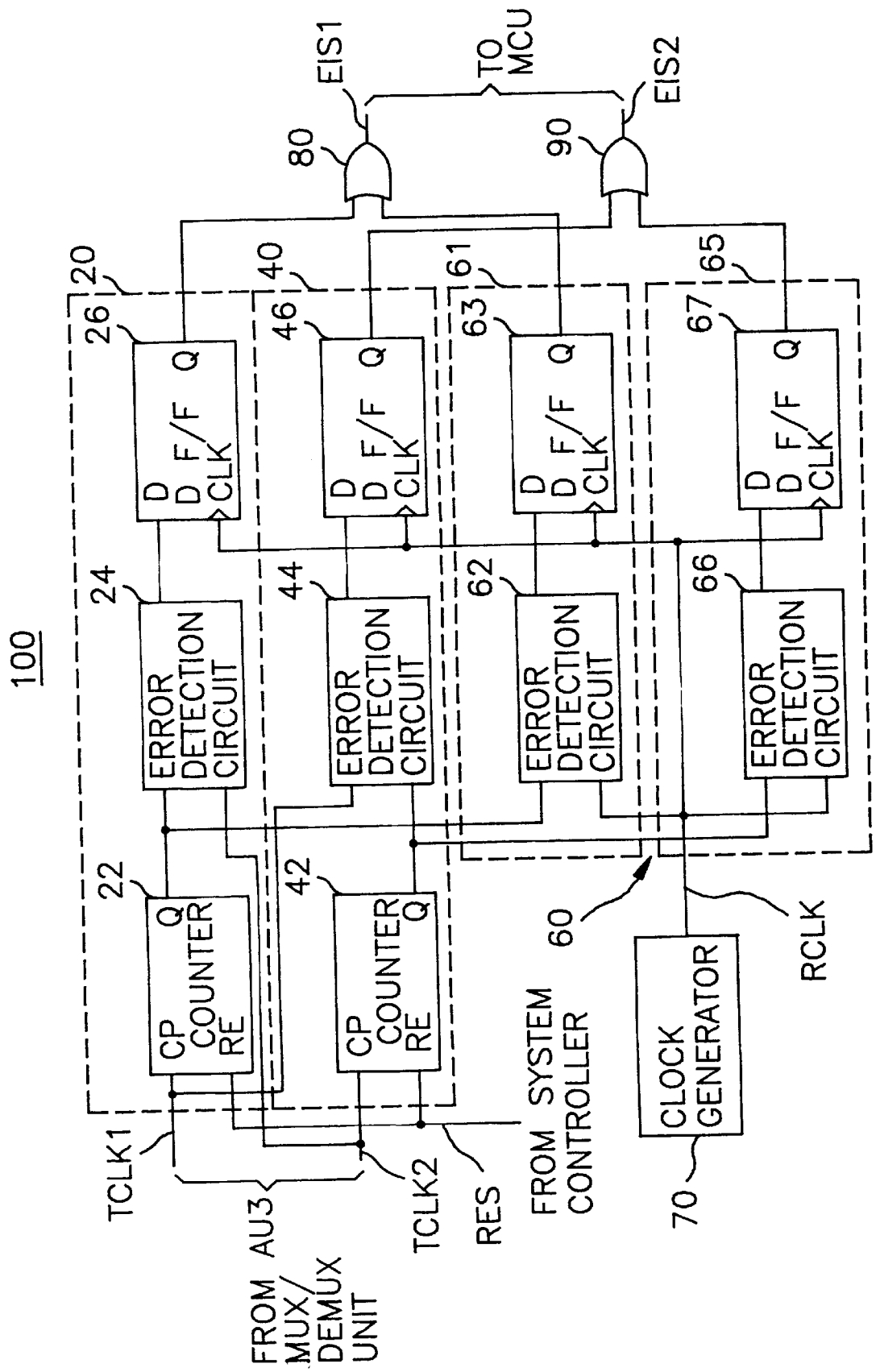

5,867,041

CLOCK SIGNAL TESTING APPARATUS FOR USE IN A SYNCHRONOUS TRANSMISSION SYSTEM

FIELD OF THE INVENTION

The present invention relates to a clock signal testing apparatus for use in a synchronous transmission system; and, more particularly, to an apparatus for effectively testing a clock signal to thereby improve the performance of the system.

BACKGROUND OF THE INVENTION

As is well known, a synchronous transmission system (STS) is widely utilized to accommodate as many voice/data channels as possible in a given communications path. Specifically, the STS converts asynchronous frame data such as digital signal level 1 (DS-1) of the North America or digital signal level 1 (DS-1E) of Europe into synchronous frame data of, e.g., synchronous transport module level 1 (STM-1), wherein there is employed a set of overhead data. The DS-1 and the DS-1E data represent pulse code modulation (PCM) serial data of a first transfer rate, e.g., 1.544 Mbps, and PCM serial data of a second transfer rate, e.g., 2.048 Mbps, respectively, whereas the STM-1 data represents PCM parallel data of a third transfer rate, e.g., 155.5 Mbps. Such a conversion operation is typically carried out on the basis of a synchronous digital hierarchy (SDH) issued by International Standards Union-Telecommunications Standardization Sector (ITU-TS).

In order to efficiently perform the conversion operation, there are generally provided two tributary unit group (TUG) clock signals in the STS, wherein the two TUG clock signals are represented by a predetermined identical clock frequency, e.g., 6 Mhz, and one of them is used as a system main clock signal. When a TUG clock signal, selected from the two TUG clock signals to be used in the STS, is detected to be erroneous or in failure, the STS immediately replaces the erroneous TUG clock signal with the other to continue the conversion process by using the replaced TUG clock signal.

As is well known in the art, such an error detection operation for each of the two TUG clock signals is performed by using a conventional clock signal testing method. In the conventional clock signal testing method, two multivibrators, and several resistors and capacitors coupled with each of the multivibrators are generally employed to test whether each TUG clock signal is normal or not. That is, each TUG clock signal is considered to be erroneous if it is not supplied to its corresponding multivibrator for a predetermined time duration, wherein the time duration depends on a time constant which is proportional to a total impedance value of the resistors and the capacitors connected to the corresponding multivibrator.

Since, however, the conventional clock signal testing method has to employ analog circuitries such as resistors and capacitors to test each of the two TUG clock signals, it is rather difficult to precisely adjust the circuit parameters to obtain the predetermined time duration employed in testing each TUG clock signal, thereby degrading the performance of the STS.

SUMMARY OF THE INVENTION

It is, therefore, a primary object of the present invention to provide an apparatus, for use in an STS, for testing a clock signal by employing an effective clock signal testing method to thereby improve the performance of the STS.

In accordance with the invention, there is provided a clock signal testing apparatus, for use in a synchronous transmission system (STS), for testing N clock signals provided from a device incorporated in the STS, N being a positive integer larger than 1, wherein the N clock signals are represented by a first predetermined clock frequency, respectively, which comprises:

a first generation means for receiving the N clock signals in response to a reset signal issued by a system controller contained in the STS and producing an error reference signal for each of the received N clock signals;

means for providing a reference clock signal represented by a second predetermined clock frequency;

a second generation means for generating a first set of error detection signals for the N clock signals based on the N clock signals, the reference clock signal and the error reference signals;

a third generation means for producing a second set of error detection signals for the N clock signals based on the reference clock signal and the error reference signals; and a fourth generation means for logically combining the first and the second sets of error detection signals to thereby produce information representing the status of each of the N clock signals.

BRIEF DESCRIPTION OF THE DRAWING

The above and other objects and features of the present invention will become apparent from the following description of preferred embodiments given with reference to the accompanying drawing, which is a functional block diagram in accordance with the present invention illustrating the novel apparatus for testing clock signals.

DETAILED DESCRIPTION OF THE PREFERRED EMBODIMENTS

Referring to the drawing, there is shown a block diagram of a novel apparatus 100 of the present invention, for use in an STS, for testing N clock signals, wherein N is a positive integer larger than 1. As is well known, there are generally provided two TUG clock signals, TCLK1 and TCLK2, in the STS to effectively perform a series of processes therein, wherein the clock signals are represented by a predetermined identical clock frequency, e.g., 6 Mhz and are produced by an administrative unit 3 multiplexer/demultiplexer (AU3 MUX/DEMUX) unit (not shown) incorporated in the STS. The inventive apparatus 100 comprises a first, a second and a third error detection devices 20, 40 and 60, and first and second error decision devices 80 and 90.

As shown in the drawing, the first and the second TUG clock signals TCLK1 and TCLK2 and a reference clock signal RCLK are provided to each of the first, the second and the third error detection devices 20, 40 and 60, wherein each of the three clock signals comprises logic high and low states. The reference clock signal RCLK, being generated by a clock generator 70 and represented by the predetermined identical clock frequency or a predetermined different clock frequency, is utilized for efficiently testing each of the first and the second TUG clock signals TCLK1 and TCLK2 by using a novel clock signal testing scheme of the invention which will be described in detail hereafter.

The first error detection device 20, which includes a counter 22, an error detection circuit 24 and a D flip/flop (F/F) 26, generates a first error detection signal EDS1 representing the status of the first TUG clock signal TCLK1 and, in response to a reset signal RES inputted to a reset (RE) terminal of the counter 22 from a system controller (not shown) in the STS, receives the first TUG clock signal TCLK1 coupled to a clock pulse (CP) terminal of the counter 22 and starts to count the number of, e.g., logic high levels of the clock signal TCLK1, wherein the counter 22 may be implemented by using a plurality of flip/flops (F/F's) (not shown). For instance, if the first TUG clock signal TCLK1 including logic high and low levels is continuously supplied to the CP terminal of the counter 22, the counter 22 sequentially counts the number of the logic high levels and generates a logic high or low signal corresponding to each counted number through an output port (Q) thereof, wherein the output port (Q) is the one associated with a F/F placed at a highest stage among the F/F's in the counter 22. In this case, therefore, the output from the counter 22 will be a pulse train signal having logic high and low levels.

On the other hand, if the first TUG clock signal TCLK1 is not provided to the CP terminal of the counter 22 for a predetermined time period TP while the counting operation is being carried out, the counter 22 retains either a logic high or low signal corresponding to a previously counted number, wherein TP is a positive number and the retained logic high or low signal is maintained and outputted through the output port (Q) until supply of the first TUG clock signal TCLK1 to the counter 22 is resumed. In a preferred embodiment of the invention, the time period TP is determined based on the number of the F/F's in the counter 22. It should be noted that the number of the F/F's may depend on the performance requirement of the STS. The output, i.e., the pulse train signal or the logic high or low signal, processed by the counter 22 is then provided, as a first error reference signal ERS1, to the error detection circuit 24 and an error detection circuit 62 of the third error detection device 60.

Inputs to the error detection circuit 24 including a counting device with a plurality of F/F's are the first error reference signal ERS1 from the counter 22 and the second TUG clock signal TCLK2 from the AU3 MUX/DEMUX unit. The error detection circuit 24, in response to the inputs applied thereto, selectively produces a logic low or high signal representing normal or abnormal status of the first TUG clock signal TCLK1, respectively. Specifically, in response to the first error reference signal ERS1 of the pulse train from the counter 22, the error detection circuit 24 counts the number of logic high levels of the second TUG clock signal TCLK2. Once the counting operation starts in the error detection circuit 24, it generates a logic low signal indicating that the first TUG clock signal TCLK1 is normal.

On the other hand, in response to the error reference signal ERS1 of the logic high or low signal, the error detection circuit 24 waits for a predetermined tolerance time period TTP, wherein TTP represents a time interval for which the STS can stably operate based on the first TUG clock signal and is determined on the basis of number of the F/F's within the error detection circuit 24, which are prepared according to G. 708 protocol recommended by International Telecommunications Union (ITU).

In a preferred embodiment of the invention, if the first error reference signal ERS1 of the pulse train after the generation of the logic high or low signal is resupplied to the error detection circuit 24 before the tolerance time period TTP is lapsed, it issues the logic low signal denoting that the first TUG clock signal TCLK1 is normal; and if otherwise, it outputs a logic high signal representing that the first TUG clock signal TCLK1 is erroneous or fails. The logic high or low signal processed by the error detection circuit 24 is then relayed as a first error detection signal EDS1 to a D terminal of the D F/F 26.

As shown in the drawing, inputs to the D and CLK terminals of the D F/F 26 are the first error detection signal EDS1 from the error detection circuit 24 and the reference clock signal RCLK from the clock generator 70, respectively. As is well known in the art, the D F/F 26 triggers only on each of positive-going transitions (PGT's) of the reference clock signal RCLK, as indicated by a small triangle on the CLK input thereof, wherein the first error detection signal EDS1 is delayed by one clock interval. That is, at the D F/F 26, the first error detection signal EDS1 from the error detection circuit 24 is latched on a PGT of the reference clock signal RCLK. And then, the first latched error detection signal EDS1 is outputted on a subsequent PGT. This operation is sequentially repeated as long as the reference clock signal RCLK is fed to the CLK input of the D F/F 26. The output, i.e., the first error detection signal EDS1 having the logic high or low value, from the D F/F 26 is then delivered to the first error decision device 80.

Subsequently, the second error detection device 40 includes a counter 42, an error detection circuit 44 and a D F/F 46 and is essentially identical to the first error detection device 20 except that it tests the second TUG clock signal TCLK2 by using clock signal TCLK2 inputted to the counter 42 and the TCLK1 inputted to the error detection circuit 44; and, accordingly, details thereof are omitted here for the sake of simplicity. An output from the counter 42 is a pulse train signal of logic high and low levels or a logic high or low signal, and that from the D F/F 46 is a second error detection signal EDS2. The second error detection signal EDS2 from the D F/F 46 is transferred to the second error decision device 90, while the output from the counter 42, the pulse train signal or the logic high or low signal, is delivered as a second error reference signal ERS2 to an error detection circuit 66 of the third error detection device 60.

As shown in the drawing, the third error detection device 60, which contains first and second error detection units 61 and 65, is utilized to efficiently test each of the first and the second TUG clock signals TCLK1 and TCLK2 when both of them fail. Testing process for each of the two TUG clock signals at the third error detection device 60 is performed in a very similar method as in the first error detection device 20 or the second error detection device 40.

Specifically, inputs to an error detection circuit 62 of the first error detection unit 61 are the outputs from the counter 22, i.e., the first error reference signal ERS1's with the pulse train signal or the logic high or low signal, and the reference clock signal RCLK from the clock generator 70, wherein the error detection circuit 62 includes a counting device equipped with a plurality of F/F's. Based on the first error reference signal ERS1, the error detection circuit 62 generates a logic high or low signal by utilizing the reference clock signal RCLK, wherein the same method used in the error detection device 24 is employed; and therefore, details thereof are omitted here for the sake of simplicity.

Thereafter, the logic high or low signal generated at the error detection circuit 62 is provided to a D terminal of a D F/F 63 of the first error detection unit 61, wherein the generated signal goes through the same process as in the D F/F 26 and accordingly, details of the D F/F 63 are omitted here for the sake of simplicity. An output from the D F/F 63 is a third error detection signal EDS3 having a logic high or low value and is outputted to the first error decision device 80.

The second error detection unit 65, which includes an error detection circuit 66 and a D F/F 67, is substantially identical to the first error detection unit 61 except that an input to the error detection circuit 66 is the second error reference signal ERS2 from the counter 42, and therefore, a detailed description of the second error detection unit 65 is omitted again for the sake of simplicity. An output from the D F/F 67 is a fourth latched error detection signal EDS4 having a logic high or low value and is provided to the second error decision device 90.

Inputs to the first error decision device 80 having an OR gate are the first and the third error detection signals EDS1 and EDS3 provided from the D F/F 26 of the first error detection device 20 and the D F/F 63 of the first error detection unit 61, respectively. The first error decision device 80 generates a first error indication signal EIS1 if any one of the two inputs applied thereto has a logic high value and provides the first error indication signal EIS1 to a main control unit (MCU) (not shown) of the STS. Similarly, inputs to the second error decision device 90 with an OR gate are the second and the fourth error detection signals EDS2 and EDS4 from the D F/F 46 of the second error detection device 40 and the D F/F 67 of the second error detection unit 65, separately. The second error decision device 90 issues a second error indication signal EIS2 if either one of the two inputs applied thereto has a logic high value to provide the second error indication signal EIS2 to the MCU. In response to an error indication signal for any one of the two TUG clock signals, the MCU immediately supplies the other clock signal to the STS so that it can continue to perform its function. Even though such is not described for the sake of simplicity, it should be appreciated that two or more other clock signals having an identical clock frequency can be also tested through the use of the same method as in the two TUG clock signals. As a result, the present invention is capable of efficiently testing each of two TUG clock signals by using the novel clock signal testing apparatus comprising only digital circuits, and advantageously adjusting their parameter values, thereby improving the performance of the STS.

While the present invention has been shown and described with respect to the particular embodiment, it will be apparent to those skilled in the art that many changes and modifications may be made without departing from the spirit and scope of the invention as defined in the appended claims.

What is claimed is:

1. A clock signal testing apparatus, for use in a synchronous transmission system (STS), for testing N clock signals in the STS, N being a positive integer larger than 1, wherein each of the N clock signals has a first predetermined clock frequency, said apparatus comprising:

means for receiving the N clock signals and a reset signal issued by a system controller included in the STS and producing an error reference signal for each of the received N clock signals;

means for providing a reference clock signal having a second predetermined clock frequency;

a first error detection means for generating a first set of error detection signals for the N clock signals, wherein an error detection signal for each of the N clock signals is obtained by using its corresponding error reference signal and any one clock signal other than said each clock signal among the N clock signals;

a second error detection means for producing a second set of error detection signals for the N clock signals based on the reference clock signal and the error reference signals; and an error decision means for logically combining the first and the second sets of error detection signals to thereby produce information representing the status of each of the N clock signals.

2. The clock signal testing apparatus of claim 1, wherein the means for producing the error reference signals is a counter which is comprised of a plurality of flip flops.

3. The clock signal testing apparatus of claim 2, wherein the means for producing the error reference signals includes:

means for checking whether or not each of the N clock signals is continuously supplied thereto for a first predetermined time period to generate a signal corresponding to the checked result, wherein the first time period is decided in accordance with the output of the counter and the reset signal; and means, in response to the signal generated from the checking means, for selectively producing a first or a second logic level as said error reference signal for said each clock signal.

4. The clock signal testing apparatus of claim 3, wherein the first error detection means is a counter with a plurality of flip flops.

5. The clock signal testing apparatus of claim 4, wherein the first error detection means includes:

means for testing whether or not the error reference signal for each of the N clock signals has a first logic level for a second predetermined time period to thereby produce a signal corresponding to the tested result, wherein the second time period is decided in accordance with the output of the counter and any one clock signal other than said each clock signal among the N clock signals; and means, in response to the signal produced from the testing means, for selectively generating a first or a second logic level as the error detection signal in the first set for said each clock signal.

6. The clock signal testing apparatus of claim 4, wherein the second error detection means includes:

means for testing whether or not the error reference signal for each of the N clock signals has a first logic level for a third predetermined time period to thereby produce a signal corresponding to the tested result, wherein the third time period is decided in accordance with the output of the counter and the reference clock signal; and means, in response to the signal produced from the testing means, for selectively generating a first or a second logic level as an error detection signal in the second set for said each clock signal.

7. The clock signal testing apparatus of claim 3, wherein the error decision means is comprised of a multiplicity of OR gates.

8. The clock testing signal apparatus of claim 1, further comprising interfacing means for interfacing each of the error detection signals in the first and the second sets with the error decision means.

9. The clock signal testing apparatus of claim 8, wherein the interfacing means is comprised of a plurality of D flip/flops.

10. The clock signal testing apparatus of claim 1, wherein N is 2.

11. A clock signal testing apparatus, for use in a synchronous transmission system (STS), for testing N clock signals in the STS, N being a positive integer larger than 1, wherein each of the N clock signals has a first predetermined clock frequency, the apparatus comprising:

means comprised of a counter with a plurality of flip flops for receiving the N clock signals and a reset signal issued by a system controller included in the STS and producing an error reference signal for each of the received N clock signals; wherein the means for producing the error reference signal includes:

means for checking whether or not each of the N clock signals is continuously supplied thereto for a first predetermined time period to generate a signal corresponding to the checked result; and means, in response to the signal generated from the checking means, for selectively producing a first or a second logic level as said error reference signal for said each clock signal; and means for providing a reference clock signal having a second predetermined clock frequency;

a first error detection means for generating a first set of error detection signals for the N clock signals, wherein an error detection signal for each of the N clock signals is obtained by using its corresponding error reference signal and any one clock signal other than said each clock signal among the N clock signals;

a second error detection means for producing a second set of error detection signals for the N clock signals based on the reference clock signal and the error reference signals; and an error decision means constructed by a multiplicity of OR gates for logically combining the first and the second sets of error detection signals to thereby produce information representing the status of each of the N clock signals.

12. A clock signal testing apparatus, for use in a synchronous transmission system (STS), for testing N clock signals in the STS, N being a positive integer larger than 1, wherein each of the N clock signals has a first predetermined clock frequency, the apparatus comprising:

means for receiving the N clock signals and a reset signal issued by a system controller included in the STS and producing an error reference signal for each of the received N clock signals;

means for providing a reference clock signal having a second predetermined clock frequency;

a first error detection means for generating a first set of error detection signals for the N clock signals, wherein an error detection signal for each of the N clock signals is obtained by using its corresponding error reference signal and any one clock signal other than said each clock signal among the N clock signals;

a second error detection means for producing a second set of error detection signals for the N clock signals based on the reference clock signal and the error reference signals;

an error decision means for logically combining the first and the second sets of error detection signals to thereby produce information representing the status of each of the N clock signals; and an interfacing means constructed by a plurality of flip/flops for interfacing each of the error detection signals in the first and the second sets with the error decision means.

13. A clock signal testing apparatus for testing a plurality of clock signals, each of said clock signals having a first clock frequency, the apparatus comprising:

a first counter configured to receive a first clock signal and output a first error reference signal indicating a failure of the first clock signal;

a first error detection circuit configured to receive the first error reference signal and a second clock signal, and generate a first error detection signal indicating that the first clock signal has failed for a first predetermined number of cycles of said second clock signal;

a second counter configured to receive said second clock signal and output a second error reference signal indicating a failure of the second clock signal;

a second error detection circuit configured to receive the second error reference signal and the first clock signal, and generate a second error detection signal indicating that the second clock signal has failed for said first predetermined number of cycles of said first clock signal;

a third error detection circuit configured to receive said first error reference signal and a reference clock signal having a second clock frequency, and output a third error detection signal indicating that the first clock signal has failed for a second predetermined number of cycles of said reference clock signal; and a fourth error detection circuit configured to receive said second error reference signal and said reference clock signal, and output a fourth error detection signal indicating that the second clock signal has failed for said second predetermined number of cycles of said reference clock signal.

14. The apparatus of claim 13, further comprising:

a first error decision circuit configured to receive said first and third error detection signals, and output a first error indication signal indicating that said first clock signal has failed for one of said first predetermined number of clock cycles of said second clock signal, and said second predetermined number of cycles of said reference clock signal; and a second error decision circuit configured to receive said second and fourth error detection signals, and output a second error indication signal indicating that said second clock signal has failed for one of said first predetermined number of clock cycles of said first clock signal, and said second predetermined number of cycles of said reference clock signal.

15. The apparatus of claim 14, wherein said first and second error decision circuits each comprise at least one OR gate.

16. The apparatus of claim 14, further comprising a D flip-flop arranged to interface each of said error detection signals with a corresponding one of said first and second error decision circuits.

17. The apparatus of claim 14, wherein each of the error detection circuits is a counter.

18. A clock signal testing apparatus for testing a plurality of clock signals, each of said clock signals having a first clock frequency, the apparatus comprising:

a first counter configured to receive a first clock signal and output a first error reference signal indicating a failure of the first clock signal;

a first error detection circuit configured to receive the first error reference signal and a second clock signal, and generate a first error detection signal indicating that the first clock signal has failed for a first predetermined number of cycles of said second clock signal;

a second error detection circuit configured to receive said first error reference signal and a reference clock signal having a second clock frequency, and output a second error detection signal indicating that the first clock signal has failed for a second predetermined number of cycles of said reference clock signal; and a first error decision circuit configured to receive said first and second error detection signals, and output a first error indication signal indicating that said first clock signal has failed for one of said first predetermined number of clock cycles of said second clock signal, and said second predetermined number of cycles of said reference clock signal.

19. The apparatus of claim 18, further comprising a D flip-flop arranged to interface each of said error detection signals with said first error decision circuits, and wherein said first error decision circuit comprises at least one OR gate.

* * * * *